US009159496B2

(12) United States Patent
Uehara et al.

(10) Patent No.: US 9,159,496 B2
(45) Date of Patent: Oct. 13, 2015

(54) METHOD OF MANUFACTURING ELECTRODE GROUP UNIT FOR LITHIUM ION CAPACITOR AND LITHIUM ION CAPACITOR

(75) Inventors: Hideaki Uehara, Tokyo (JP); Yukio Iida, Tokyo (JP); Yoshimi Wakamatsu, Tokyo (JP); Haruki Hoshi, Tokyo (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 170 days.

(21) Appl. No.: 13/805,256

(22) PCT Filed: Sep. 15, 2011

(86) PCT No.: PCT/JP2011/071159
§ 371 (c)(1),
(2), (4) Date: Dec. 18, 2012

(87) PCT Pub. No.: WO2012/036249
PCT Pub. Date: Mar. 22, 2012

(65) Prior Publication Data
US 2013/0163147 A1    Jun. 27, 2013

(30) Foreign Application Priority Data

Sep. 16, 2010    (JP) .................................. 2010-207993

(51) Int. Cl.
*H01G 9/00*      (2006.01)
*H01G 9/048*     (2006.01)
(Continued)

(52) U.S. Cl.
CPC ............. *H01G 9/0029* (2013.01); *H01G 9/048* (2013.01); *H01G 11/06* (2013.01); *H01G 11/28* (2013.01);
(Continued)

(58) Field of Classification Search
CPC ................................ H01G 9/155; Y02E 60/13

USPC .......................................... 361/502; 29/25.03
See application file for complete search history.

(56) References Cited

FOREIGN PATENT DOCUMENTS

JP    2006-286974 A    10/2006
JP    2010-93178 A     4/2010
(Continued)

OTHER PUBLICATIONS

Corresponding International Search Report with English Translation dated Dec. 20, 2011 (three (3) pages).
(Continued)

*Primary Examiner* — Eric Thomas
*Assistant Examiner* — Arun Ramaswamy
(74) *Attorney, Agent, or Firm* — Crowell & Moring LLP

(57) ABSTRACT

A method of manufacturing an electrode group unit for lithium ion capacitor that allows reliable welding between a current collecting member and an electrode and that provides a welded portion with a low resistance is provided. A lithium ion capacitor is also provided. An unapplied portion 25 of a positive electrode 9 and an unapplied portion 33 of a negative electrode 11 are disposed to project outside of separators 13, 15 in directions opposite to each other. The resulting assembly is wound into a swirling shape in cross section about an axial core 7 to form an electrode group 5. A lithium metal support member 17 is disposed on the negative electrode 11 such that a layer in which the lithium metal support member 17 is wound is located in a radially middle region of the electrode group 5. A negative current collecting member 45 is placed on the unapplied portion 33, and welding is performed using a direct-collecting semiconductor laser device that continuously generates laser light to manufacture an electrode group unit 2 for lithium ion capacitor. The electrode group unit 2 for lithium ion capacitor is housed in a container 3 to obtain a lithium ion capacitor 1.

12 Claims, 12 Drawing Sheets

(51) Int. Cl.
  *H01G 11/06* (2013.01)
  *H01G 11/28* (2013.01)
  *H01G 11/50* (2013.01)
  *H01G 11/66* (2013.01)
  *H01G 11/74* (2013.01)
  *H01G 11/78* (2013.01)
  *H01G 11/82* (2013.01)
  *H01G 11/86* (2013.01)

(52) U.S. Cl.
  CPC ............... *H01G 11/50* (2013.01); *H01G 11/66* (2013.01); *H01G 11/74* (2013.01); *H01G 11/78* (2013.01); *H01G 11/82* (2013.01); *H01G 11/86* (2013.01); *H01G 9/155* (2013.01); *Y02E 60/13* (2013.01); *Y10T 29/417* (2015.01)

(56) References Cited

FOREIGN PATENT DOCUMENTS

| | | | |
|---|---|---|---|
| JP | 2010093178 A | * | 4/2010 |
| JP | 2010-141217 A | | 6/2010 |
| JP | 2010186779 A | * | 8/2010 |
| JP | 2010-283115 A | | 12/2010 |

OTHER PUBLICATIONS

Chinese Office Action dated Apr. 28, 2015, with partial English translation (seventeen (17) pages).

* cited by examiner

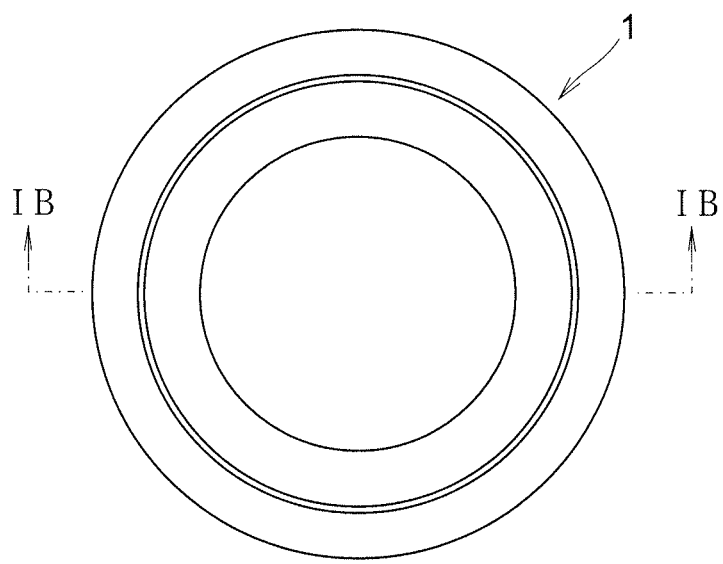

9A, 9B (11)

21 (29)

19 (27)

25 (33)

23 (31)

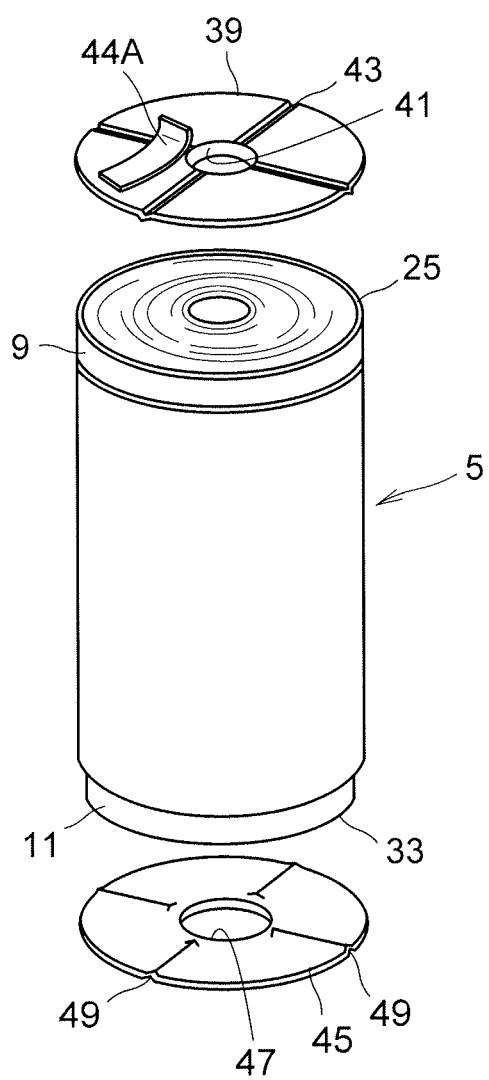

METHOD OF MANUFACTURING ELECTRODE GROUP UNIT FOR LITHIUM ION CAPACITOR AND LITHIUM ION CAPACITOR

TECHNICAL FIELD

The present invention relates to a method of manufacturing an electrode group unit for lithium ion capacitor, and to a lithium ion capacitor including the electrode group unit.

BACKGROUND ART

Lithium ion capacitors that combine advantages of a lithium ion battery and advantages of an electric double-layer capacitor are developed as high-capacitance capacitors (with a capacitance of 500 F or more, for example). In recently developed lithium ion capacitors, in general, activated carbon is used as a positive active material, and a carbon material capable of occluding and releasing lithium ions is used as a negative active material. The potential of the negative electrode is kept lower (at approximately −3 V) in the lithium ion capacitor than in the normal electric double-layer capacitor (at approximately −1 V to −1.35 V) since lithium ions are occluded or doped in a negative electrode in advance. Therefore, the cell can be used in a higher voltage range (approximately 2.2 V to 3.8 V). In addition, because the lithium ion capacitor can also serve as a positive electrode charge/discharge mechanism that can adsorb positive ions, in addition to adsorbing negative ions which are utilized by the normal electric double-layer capacitor, the lithium ion capacitor can have a double capacity in principle. Further, while the lithium ion capacitor has a small capacitance compared to the lithium ion battery, the lithium ion capacitor advantageously has a low internal resistance, excellent output characteristics, and a long life [Japanese Unexamined Patent Application Publication No. 2010-141217 (Patent Document 1)]. Patent Document 1 discloses a structure in which a plurality of tabs are used to connect a current collector and a current collecting member to each other.

In order to reliably weld a negative current collector made of a copper foil and a negative current collecting member made of copper during manufacture of such a lithium ion capacitor, laser welding may be performed using YAG laser light [Japanese Unexamined Patent Application Publication No. 2010-93178 (Patent Document 2)]. Patent Document 2 discloses a structure in which a negative current collector is directly welded to a negative current collecting member without using tabs.

RELATED-ART DOCUMENT

Patent Document

[Patent Document 1] Japanese Unexamined Patent Application Publication No. 2010-141217
[Patent Document 2] Japanese Unexamined Patent Application Publication No. 2010-93178

SUMMARY OF INVENTION

Technical Problem

In the welding technique which uses YAG laser light as taught in Patent Document 2 or $CO_2$ laser light, however, the energy of the collected laser light may be so high that a portion of the metal irradiated with the laser may be evaporated. As a reaction, the metal may be melted to form a so-called "keyhole". Therefore, the molten metal may be scattered (sputtered), or gas may enter the hole in the molten metal and form a blowhole, leading to welding defects. Moreover, the YAG laser light and the $CO_2$ laser light has a small spot diameter, and the focal point of such light may vary according to a rise in temperature of a lens for collecting the laser light. Thus, the welding position may be easily displaced, leading to fluctuations in welding quality. If the current collecting member and the current collector of the electrode are not sufficiently welded to each other during manufacture of the lithium ion capacitor, the resistance at the welded portion may be increased to degrade the performance of the capacitor.

An object of the present invention is to provide a method of manufacturing an electrode group unit for lithium ion capacitor that allows reliable welding between a current collecting member and an electrode, that provides a welded portion with a low resistance, and that prevents a short circuit due to a molten metal, and to provide a lithium ion capacitor.

Another object of the present invention is to provide a method of manufacturing an electrode group unit for lithium ion capacitor that allows lithium metal to be reliably occluded during preliminary charging, and to provide a lithium ion capacitor.

Solution to Problem

The present invention provides a method of manufacturing an electrode group unit for lithium ion capacitor including, as its basic components, an electrode group formed by winding a laminated member in which a positive electrode formed by applying a positive active material mixture to an aluminum foil (positive current collector) and a negative electrode formed by applying a negative active material mixture to a copper foil (negative current collector) are laminated on each other via a separator, a positive current collecting member made of aluminum and electrically connected to the aluminum foil of the positive electrode, a negative current collecting member made of a metal material and electrically connected to the copper foil of the negative electrode, and a lithium metal support member including lithium metal and a support member made of a copper foil and electrically connected to the negative current collecting member, the support member having ion permeability and having a structure for supporting the lithium metal.

The lithium metal support member is disposed in or adjacent to the electrode group where the lithium metal support member is electrically insulated from the positive electrode and such that the lithium metal is occluded by (pre-doped into) a negative active material contained in the negative active material mixture of the negative electrode so that only the copper foil remains.

In the method of manufacturing an electrode group unit for lithium ion capacitor according to the present invention, the negative electrode that has a layer of the negative active material mixture on the copper foil and has an unapplied portion on which the negative active material mixture is not applied along the layer of the negative active material mixture is prepared. The positive electrode that has a layer of the positive active material mixture on the aluminum foil and has an unapplied portion on which the positive active material mixture is not applied along the layer of the positive active material mixture is prepared. The electrode group is formed such that the unapplied portion of the negative electrode and the unapplied portion of the positive electrode project outside of the separator in directions opposite to each other. The negative current collecting member is placed on the unapplied portion of the negative electrode of the thus configured electrode group and the end portion of the support member, and welding is performed using a direct-condensing semiconductor laser device.

A direct-collecting semiconductor laser device (Direct Diode Laser: DDL) used in the present invention is a semiconductor laser device that directly collects and outputs laser light from a semiconductor laser light source that emits laser diode (LD) light capable of high-efficiency oscillation (for example, high-power semiconductor laser devices available from Coherent Japan, Inc. and Laserline GmbH). The direct-collecting semiconductor laser device enables welding by melting metal using heat conducted by the laser light, and can continuously generate the laser light. Therefore, a so-called keyhole is not formed, the molten metal is not scattered, or a blowhole is not formed. Rather, performing laser welding using the direct-collecting semiconductor laser device allows the negative current collecting member to be efficiently melted, enables reliable welding, and reliably prevents an increase in resistance of the welded portion. Since little sputter due to scattered molten metal is produced, there is little possibility that a short circuit with a container is caused when the electrode group unit for lithium ion capacitor is housed in the container. In the present invention, further, the negative current collecting member is directly welded to the unapplied portion of the negative electrode of the wound electrode group. This increases the welding area, which reduces the contact resistance. In the present invention, in particular, the support member of the lithium metal support member made of a copper foil is also welded to the negative current collecting member. Therefore, the lithium metal support member and the negative current collecting member can be reliably welded to each other without increasing the resistance of the welded portion. This allows the lithium metal to be reliably occluded by the negative active material contained in the negative active material mixture of the negative electrode during preliminary charging. This also prevents the remaining support member from slipping off after the lithium metal is occluded.

The wavelength and the power of the laser light output from the direct-collecting semiconductor laser device used may be selected such that the negative current collecting member can be efficiently melted. In the present invention, a fiber-guided semiconductor laser device (FOLD) that collects output laser light in an optical fiber to facilitate handling may be used as the direct-collecting semiconductor laser device.

The direct-collecting semiconductor laser device used for the negative electrode side in the present invention can be also used to weld aluminum used for the positive current collecting member and the positive electrode. Therefore, the same welding device can be used to weld not only the negative current collecting member and the negative electrode but also the positive current collecting member and the positive electrode. That is, the positive current collecting member may be placed on the unapplied portion of the positive electrode of the electrode group, and the positive current collecting member may be locally melted by continuously irradiating the positive current collecting member with laser light continuously generated by a direct-condensing semiconductor laser device, to weld the unapplied portion of the positive electrode and the positive current collecting member to each other with a molten metal. Thus, welding work can be performed for both the negative electrode side and the positive electrode side using a single direct-collecting semiconductor laser device, improving the production efficiency.

In the manufacturing method according to the present invention, welding is preferably performed such that the molten metal does not extend radially outward beyond an electrode layer located on the radially outermost side of the electrode group. This is because if the molten metal extended radially outward beyond the electrode layer located on the radially outermost side of the electrode group, the molten metal might electrically contact the wall surface of a metal container and cause a short circuit when the electrode group unit for lithium ion capacitor manufactured by the manufacturing method according to the present invention is finally housed in the container.

In order to more reliably occlude the lithium metal, the electrode group is preferably formed such that the length of projection of an end portion of the support member from the separator is larger than the length of projection of the unapplied portion of the negative electrode from the separator. This configuration allows more reliable welding between the negative current collecting member and the support member, and allows the lithium metal to be reliably occluded without increasing the resistance value of the welded portion. In other words, the support member is deeply embedded into the melted negative current collecting member to increase the contact area. This helps suppress an increase in resistance value of the welded portion.

The lithium metal support member may be located at any position in the electrode group. For example, the lithium metal support member may be located such that a layer in which the lithium metal support member is wound is located outside of the electrode group. In this case, however, it is necessary to increase the diameter of the negative current collecting member to reliably weld the negative current collecting member and the support member of the lithium metal support member to each other. It is also necessary that welding should be performed to the outside of the negative current collecting member, which makes it highly likely that the molten metal due to the welding extends beyond an electrode layer located on the radially outermost side of the electrode group. Therefore, the lithium metal support member is preferably disposed such that a layer in which the lithium metal support member is wound is located in a radially middle region of the electrode group. If the lithium metal support member is disposed in this way, it is not necessary to substantially increase the diameter of the negative current collecting member. In addition, the support member of the lithium metal support member and the negative current collecting member can be reliably welded to each other even if welding is not performed to an end of the negative current collecting member.

A recessed portion or a projected portion extending linearly is preferably formed by pressing at a portion of each of the negative current collecting member and the positive current collecting member that is irradiated with the laser light. This configuration prevents thermal diffusion of heat produced by the laser light, and clearly indicates the position to be irradiated with the laser light, which allows accurate welding of a desired position.

The electrode group unit for lithium ion capacitor manufactured as described above can be applied to a lithium ion capacitor.

The present invention can also be implemented as a lithium ion capacitor. The present invention provides a lithium ion capacitor having the electrode group unit for lithium ion capacitor manufactured by the method discussed earlier. As discussed earlier, the electrode group unit for lithium ion capacitor includes an electrode group formed by winding a laminated member in which a positive electrode formed by applying a positive active material mixture to an aluminum foil and a negative electrode formed by applying a negative active material mixture to a copper foil are laminated on each other via a separator, a positive current collecting member made of aluminum and electrically connected to the aluminum foil of the positive electrode, and a negative current collecting member made of a metal material and electrically connected to the copper foil of the negative electrode. The electrode group unit for lithium ion capacitor also includes a lithium metal support member including lithium metal and a support member made of a copper foil and electrically connected to the negative current collecting member, the support member having ion permeability and having a structure for supporting the lithium metal. The lithium metal support member is disposed in or adjacent to the electrode group where the lithium metal support member is electrically insulated from the positive electrode and such that the lithium metal is occluded by a negative active material contained in the negative active material mixture of the negative electrode so that only the copper foil remains. In the lithium ion capacitor according to the present invention, the electrode group unit for lithium ion capacitor is housed in a bottomed container, an opening portion of which is sealed by a lid member serving also as a terminal electrode.

The negative electrode has a layer of the negative active material mixture on the copper foil and has an unapplied portion on which the negative active material mixture is not applied along the layer of the negative active material mixture, and the positive electrode has a layer of the positive active material mixture on the aluminum foil and has an unapplied portion on which the positive active material mixture is not applied along the layer of the positive active material mixture. The electrode group is formed such that the unapplied portion of the negative electrode and the unapplied portion of the positive electrode project outside of the separator in directions opposite to each other. The negative current collecting member is laser-welded to the unapplied portion of the negative electrode of the electrode group and an end portion of the support member. The metal material of the negative current collecting member is a material that is melted by laser light continuously output from a direct-collecting semiconductor laser device. Consequently, a lithium ion capacitor in which the negative electrode and the negative current collecting member are reliably welded to each other and which has a welded portion with a low contact resistance can be provided.

The metal material of the negative current collecting member melted by the laser light continuously output from the direct-collecting semiconductor laser device may be nickel or copper plated with nickel.

BRIEF DESCRIPTION OF DRAWINGS

FIG. 1A is a plan view of a lithium ion capacitor according to the present invention.

FIG. 7 shows a combination of the electrode group, the positive current collecting member, and the negative current collecting member according to the present invention.

DESCRIPTION OF EMBODIMENTS

An embodiment in which the present invention is applied to a cylindrical lithium ion capacitor will be described below with reference to the drawings.
(Configuration)
<Overall Configuration>

Figure 1B:
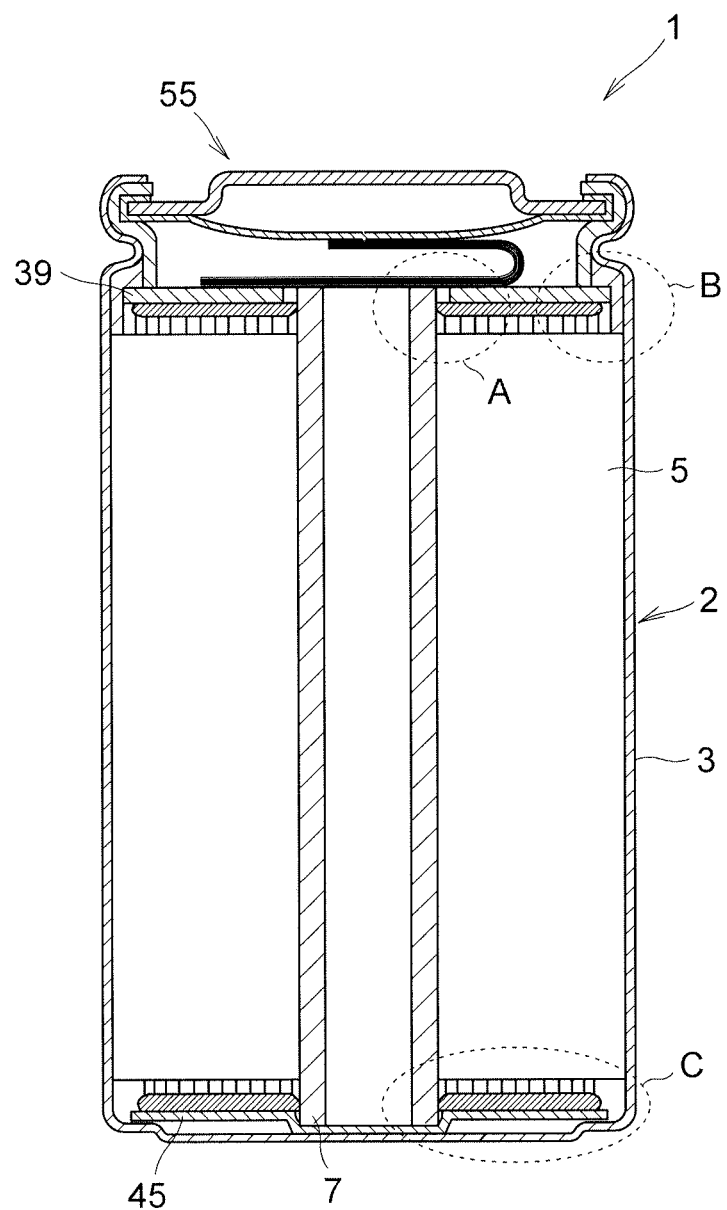
FIG. 1B is a cross-sectional view taken along the line IB-IB of FIG. 1A.
Figure 2:
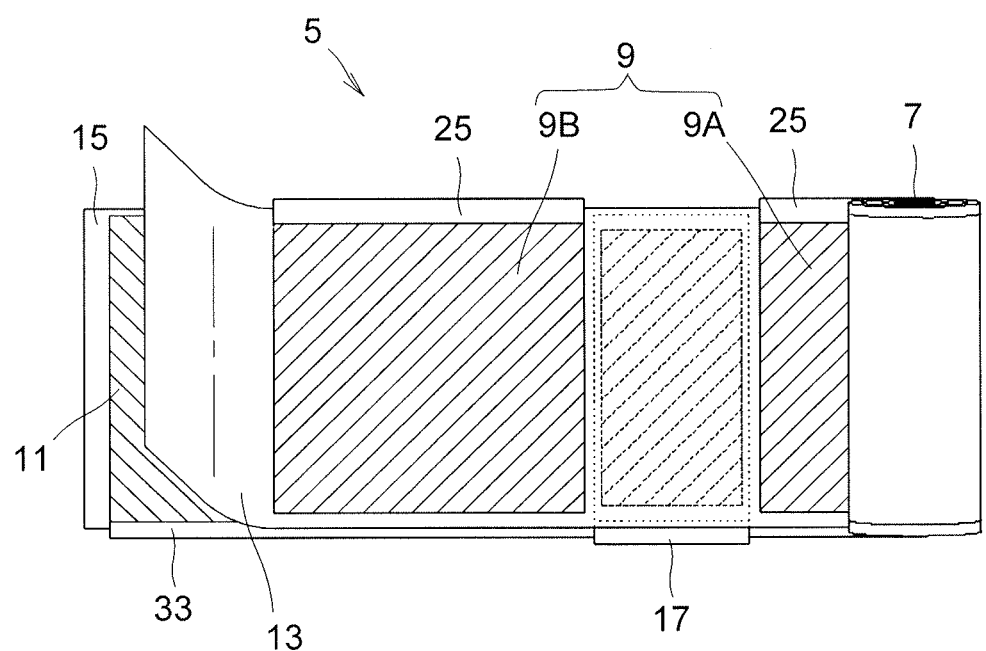
FIG. 2 shows an electrode group according to the present invention as developed.

FIG. 1A is a plan view of a lithium ion capacitor 1 (hereinafter simply referred as "capacitor 1") according to the embodiment with a positive electrode facing up, and FIG. 1B is a cross-sectional view taken along the line IB-IB of FIG. 1A. In FIG. 1B, the cross-sectional shape of an electrode group 5 is not shown, and cross-sectional portions are not hatched. The capacitor 1 includes a container (can) 3 made of steel plated with nickel and having the shape of a bottomed cylinder. An electrode group unit 2 for lithium ion capacitor is housed in the container 3. The electrode group unit 2 for lithium ion capacitor is a combination of the electrode group 5, a positive current collecting member 39, and a negative current collecting member 45. As shown in FIGS. 1B and 2, the electrode group 5 is formed by winding a sheet-like positive electrode 9 and a sheet-like negative electrode 11 around a hollow cylindrical axial core 7 made of polypropylene via a first separator 13 and a second separator 15. A lithium metal support member 17 including lithium metal is disposed in the electrode group 5 before doping as shown in FIG. 2. The positive electrode 9 is formed from two divided positive electrodes 9A, 9B. The first and second separators 13, 15 may be a porous base material such as kraft paper.
<Positive Electrode>

Figure 3A:
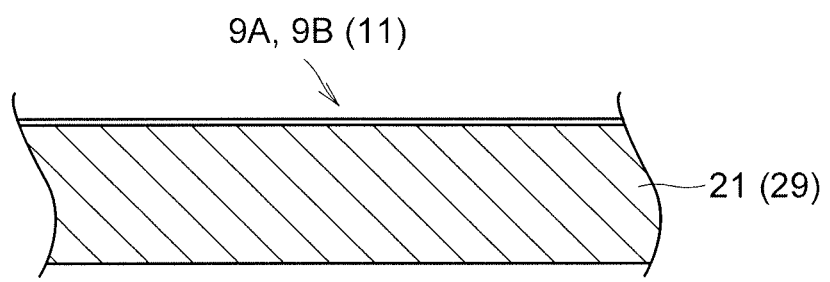
FIGS. 3A and 3B show examples of a positive electrode and a negative electrode, respectively, according to the present invention.
Figure 3B:
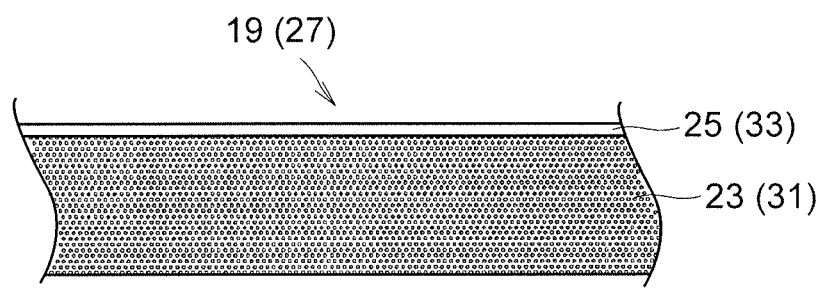

The divided positive electrodes 9A, 9B forming the positive electrode 9 have the same structure as each other except for their lengths. As shown in FIGS. 3A and 3B, the divided positive electrodes 9A, 9B are formed by applying a positive active material mixture 21 to both surfaces of an aluminum foil (positive current collector) 19, for example. Herein, the aluminum foil 19 includes an aluminum alloy foil. The positive active material mixture 21 may be a mixture of activated carbon, a binding agent such as an acrylic binder, and a dispersing agent made of carboxymethyl cellulose (CMC), for example. The aluminum foil 19 includes an applied portion 23 in which a multiplicity of through holes are formed and on which the positive active material mixture 21 is applied, and an unapplied portion 25 which is formed along the longitudinal direction of the applied portion 23 and in which through holes are not formed. The positive active material mixture 21 is applied to the applied portion 23 over a length less than the length of the applied portion 23 in the width direction. That is, the unapplied portion 25 of the aluminum foil 19 remains exposed along the layer of the positive active material mixture 21.

<Negative Electrode>

The negative electrode 11 has a structure similar to that of the divided positive electrodes 9A and 9B shown in FIGS. 3A and 3B. That is, in the negative electrode 11, a negative active material mixture 29 is applied to both surfaces of a copper foil (negative current collector) 27. Herein, the copper foil includes not only a pure copper foil but also a copper alloy foil. The negative active material mixture 29 may be a mixture of amorphous carbon capable of occluding and releasing lithium ions, a binding agent made of polyvinylidene fluoride (PVDF), and a conductive assistance such as acetylene black, for example. The copper foil 27 includes an applied portion 31 in which a multiplicity of through holes are formed, and an unapplied portion 33 which is formed along the longitudinal direction of the applied portion 31 and in which through holes are not formed. The negative active material mixture 29 is applied to the applied portion 31 over a length less than the length of the applied portion 31 in the width direction. That is, the unapplied portion 33 of the copper foil 27 remains exposed along the layer of the negative active material mixture 29.

<Lithium Metal Support Member>

Figure 4A:
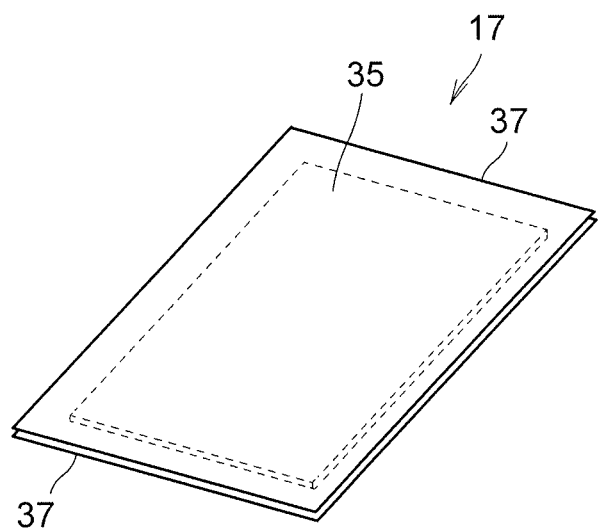
FIGS. 4A and 4B show an example of a lithium metal support member according to the present invention.
Figure 4B:
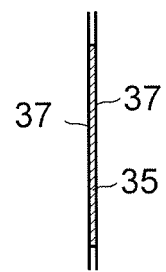

The lithium metal support member 17 causes the negative active material (in the embodiment, amorphous carbon) of the negative electrode 11 to occlude (be doped with) lithium ions. As shown in FIGS. 4A and 4B, the lithium metal support member 17 includes lithium metal 35 having a thin plate shape and two copper foils (support members) 37, 37. The copper foils 37, 37 may be obtained by cutting the same material as that for the copper foil forming the negative electrode 11 into predetermined dimensions. A multiplicity of through holes (not shown) are formed in the copper foils 37, 37. The lithium metal 35 is sandwiched between the two copper foils 37, 37 to contact portions of the two copper foils 37 in which the multiplicity of through holes are formed.

<Electrode Group>

As shown in FIG. 2, the electrode group 5 is formed by winding the positive electrode 9 (divided positive electrodes 9A, 9B) and the negative electrode 11 into a swirling shape in cross section about the axial core 7 via the two separators 13, 15 such that the positive electrode 9 and the negative electrode 11 do not directly contact each other. The lithium metal support member 17 is disposed on the negative electrode 11 such that a layer in which the lithium metal support member 17 is wound is located in a radially middle region of the electrode group 5. The positive electrode 9 and the negative electrode 11 are disposed such that their respective unapplied portions (25 and 33) project outside of the separators 13, 15 in directions opposite to each other. A winding end portion of the electrode group 5 is fixed by affixing an adhesive tape across the winding end portion and the outer peripheral surface of the electrode group 5 to prevent unwinding of the electrode group 5.

<Positive Current Collecting Member>

Figure 5:
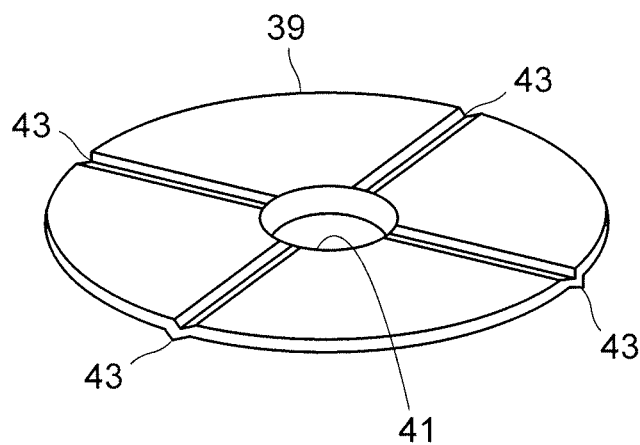
FIG. 5 shows an example of a positive current collecting member according to the present invention.

The positive current collecting member 39 is made of aluminum (including an aluminum alloy), and has a ring shape in which a circular hole 41 is formed in the center portion as shown in FIG. 5. As shown in FIG. 1B, the hole 41 has a diameter that allows the positive current collecting member 39 to be fitted with the upper end of the axial core 7 to prevent the positive current collecting member 39 from being displaced from the center of the electrode group 5. The positive current collecting member 39 is welded to the unapplied portion 25 of the positive electrode 9 included in the electrode group 5. Thus, as shown in FIG. 7, the positive current collecting member 39 is moved closer toward the electrode group 5 from the side of the electrode group 5 where the unapplied portion 25 of the positive electrode 9 is located, so that the positive current collecting member 39 is placed on the unapplied portion 25 of the aluminum foil 19 of the positive electrode 9. Then, the unapplied portion 25 and the positive current collecting member 39 are welded to each other by laser welding to be discussed later. For laser welding, the positive current collecting member 39 is provided with four grooves 43 that form recessed portions for welding that are convex toward the electrode group 5 and that are open in the direction opposite to the electrode group 5. The grooves 43 are formed by pressing, and extend linearly radially from the imaginary center point of the positive current collecting member 39. A positive terminal portion 44A welded to the positive current collecting member 39 which is shown in FIG. 7 is to be welded to a container lid 55 shown in FIG. 1B. During assembly, an insulating ring member made of rubber is mounted on the outer peripheral portion of the positive current collecting member 39 for electrical insulation as shown in FIG. 1B.

<Negative Current Collecting Member>

Figure 6:
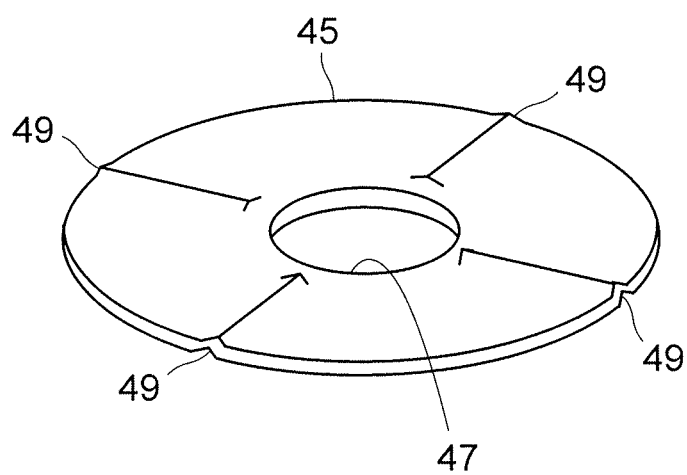
FIG. 6 shows an example of a negative current collecting member according to the present invention.

The negative current collecting member 45 is made of either nickel or a metal material obtained by plating copper with nickel. In the embodiment, the negative current collecting member 45 is made of a metal material obtained by plating copper with nickel. As shown in FIG. 6, the negative current collecting member 45 has a disk shape in which a circular dent 47 is formed in the center portion. The dent 47 is formed to receive the lower end of the axial core 7. As shown in FIG. 7, the negative current collecting member 45 is moved closer toward the electrode group 5 from the side of the electrode group 5 where the unapplied portion 33 of the negative electrode 11 is located, so that the negative current collecting member 45 is placed on the unapplied portion 33 of the copper foil 27. Then, the negative current collecting member 45 and the unapplied portion 33 of the copper foil 27 are welded to each other by laser welding. As with the positive current collecting member 39, the negative current collecting member 45 is also provided with four grooves 49 that form recessed portions for welding that are convex toward the electrode group 5 and that are open in the direction opposite to the electrode group 5. The grooves 49 are formed by pressing, and extend linearly radially from the imaginary center point of the negative current collecting member 45.

<Welding between Electrode Group and Current Collecting Members>

Laser light is used to weld the unapplied portions 25 and 33 of the electrode group 5 and the current collecting members (positive current collecting member 39 and negative current collecting member 45) to each other. In the embodiment, in particular, a direct-collecting semiconductor laser device (DDL, not shown) that continuously generates laser light is used as a laser welding device. The direct-collecting semiconductor laser device according to the embodiment uses laser diode light capable of high-efficiency oscillation. The laser light has a concentration of about one tenth that of YAG laser light and $CO_2$ laser light, has an elliptical beam shape, and enables welding by melting metal using heat conducted by the laser light. Use of such a direct-collecting semiconductor laser device enables reliable welding that produces little sputter due to scattered molten metal. Welding of the negative current collecting member 45 will be described as an example. The negative current collecting member 45 is locally melted by continuously applying laser light continuously generated by the direct-collecting semiconductor laser device along the grooves 49 of the negative current collecting member 45 from the outer peripheral side toward the center portion of the negative current collecting member 45, to weld the unapplied portion 33 of the copper foil 27 of the negative electrode 11 and end portions of the support members 37, 37 and the negative current collecting member 45 to each other with a molten metal. Performing laser welding using the direct-collecting semiconductor laser device as in the embodiment allows the negative current collecting member 45 to be efficiently melted, enables reliable welding, and reliably prevents an increase in resistance of the welded portion. Use of a fiber-guided semiconductor laser device in place of the direct-collecting semiconductor laser device also achieves good welding results.

Figure 8A:
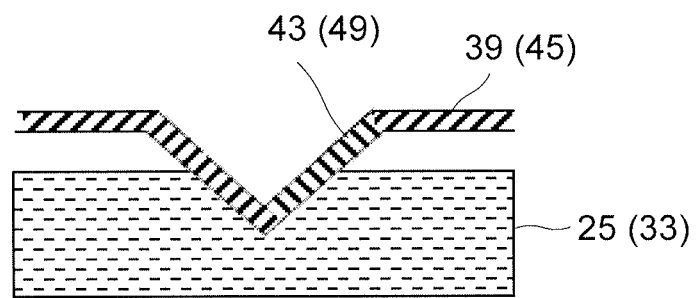
FIGS. 8A and 8B show a state in which a current collecting member and an electrode according to the present invention are welded to each other.
Figure 8B:
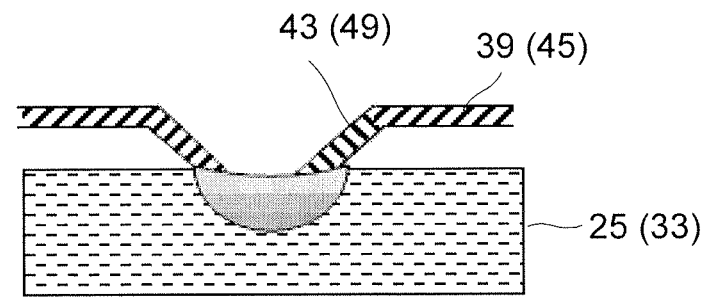

FIGS. 8A and 8B are a cross-sectional view before welding and a cross-sectional view after welding, respectively, showing the positive current collecting member 39 and the unapplied portion 25 of the aluminum foil 19 of the positive electrode 9 in cross section orthogonal to the groove 43. In the state before welding shown in FIG. 8A, the positive current collector made of the aluminum foil 19 has been deformed by the tip of an angled convex thread formed by forming the groove 43 of the positive current collecting member 39. In the state shown in FIG. 8B in which welding is completed, a portion of the positive current collecting member 39 at the bottom portion of the groove 43 has been melted to weld the unapplied portion 25 of the aluminum foil 19 of the positive electrode 9 and the positive current collecting member 39 to each other with a molten metal.

The negative current collecting member 45 and the unapplied portion 33 of the negative electrode 11 are also welded to each other in the same manner. That is, the negative current collecting member 45 is melted to weld the unapplied portion 33 of the negative electrode 11 and the negative current collecting member 45 to each other with a molten metal. As discussed later, respective ends of the support members 37, 37 forming the lithium metal support member 17 are also welded to the negative current collecting member 45 in the same manner.

Figure 9A:
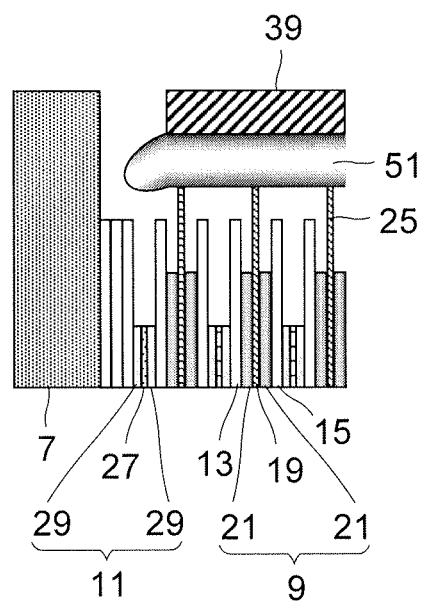
FIG. 9A is a cross-sectional view showing the region A of FIG. 1B as enlarged.
Figure 9B:
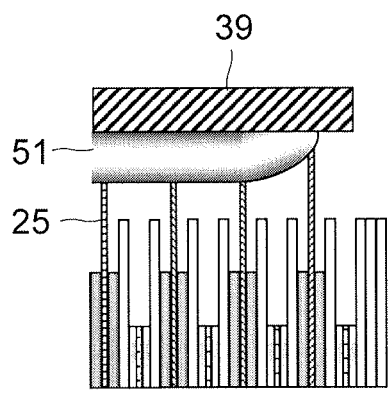
FIG. 9B is a cross-sectional view showing the region B of FIG. 1B as enlarged.

FIG. 9A is a cross-sectional view showing the region A of FIG. 1B as enlarged. FIG. 9A shows a state in which the positive current collecting member 39 and the unapplied portion 25 of the positive electrode 9 are welded to each other such that the molten metal extends to the vicinity of the axial core 7. FIG. 9B shows the region B of FIG. 1B as enlarged. FIG. 9B shows a state in which the positive current collecting member 39 and the unapplied portion 25 of the aluminum foil 19 are welded to each other in the vicinity of the wall surface of the container 3. In FIGS. 9A and 9B, some members are not shown, and the number of layers in the electrode group 5 may be different from the actual number. In the embodiment, welding is performed while moving laser light from the container 3 side toward the center. As a result, a welding bead is formed to extend toward the axial core 7 as shown in FIG. 9B when a molten metal 51 is hardened. Therefore, the molten metal 51 does not extend toward the container 3 beyond the outermost peripheral surface of the electrode group 5. As a result, the hardened molten metal 51 does not contact the wall surface of the container 3 and cause a short circuit.

Figure 10:
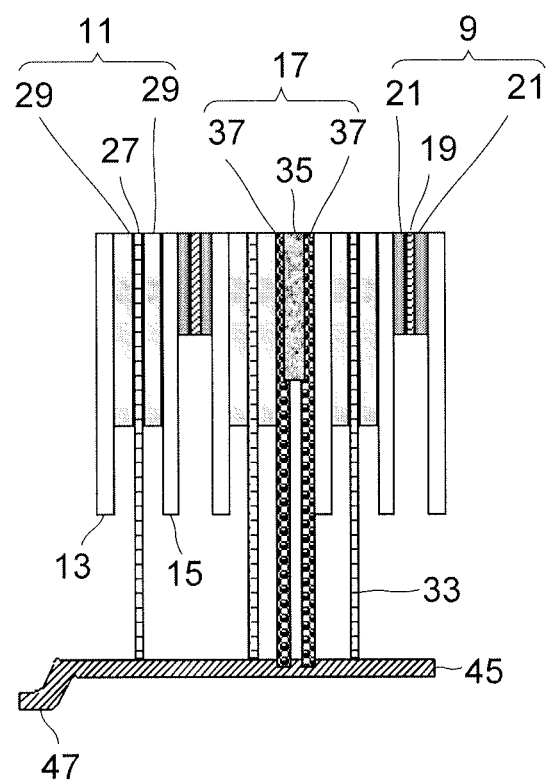
FIG. 10 is a cross-sectional view showing the region C of FIG. 1B as enlarged.

FIG. 10 is a cross-sectional view showing the region C of FIG. 1B as enlarged. FIG. 10 shows a state in which the negative current collecting member 45 and the unapplied portion 33 of the copper foil 27 are welded to each other. In FIG. 10, some members such as the axial core 7 and a molten metal 53 are not shown, and the number of layers in the electrode group 5 may be different from the actual number. In the embodiment, as is clear from FIG. 10, not only the unapplied portion 33 of the copper foil 27 but also the support members 37, 37 forming the lithium metal support member 17 are welded to the negative current collecting member 45. The end portions of the support members 37, 37 are configured such that the length of projection of the end portions of the support members 37, 37 from the separators 13, 15 is larger than the length of projection of the unapplied portion 33 from the separators 13, 15. This configuration allows more reliable welding between the negative current collecting member 45 and the support members 37, 37, and allows the lithium metal 35 to be reliably occluded without increasing the resistance value of the welded portion. Since the support members 37, 37 are also welded, the remaining support members 37, 37 can be prevented from slipping off after the lithium metal 35 is occluded.

Thus, in the embodiment, welding work can be performed for both the negative electrode side and the positive electrode side without changing the settings of a single direct-collecting semiconductor laser device, improving the production efficiency.

<Accommodation of Electrode Group into Container>

Figure 11:
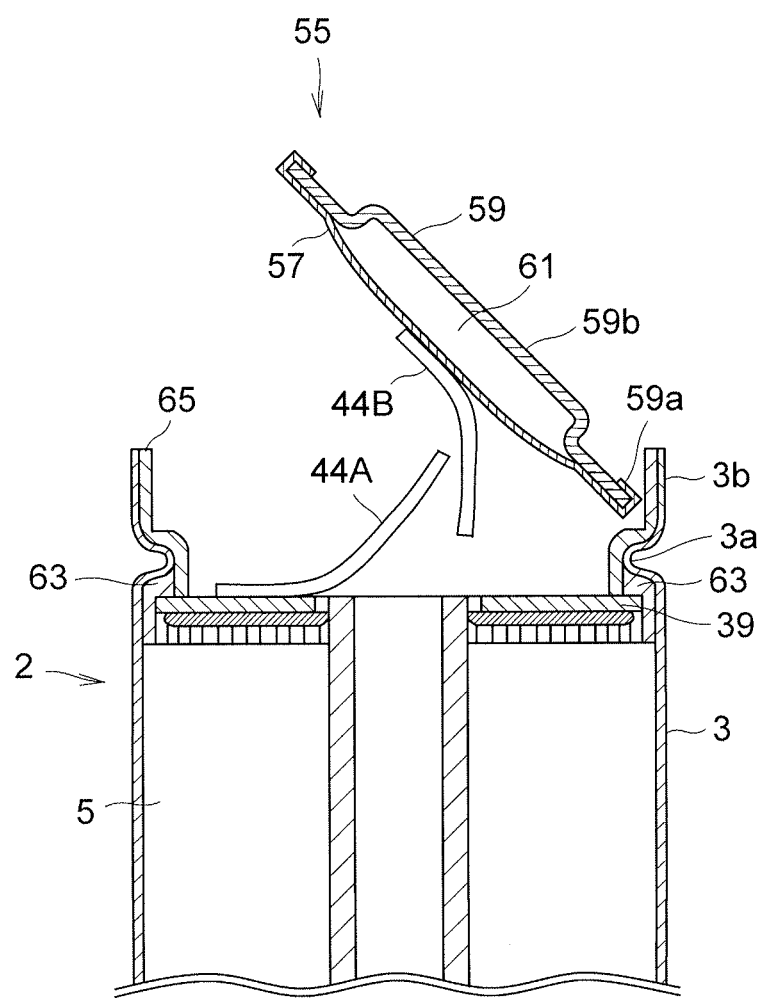
FIG. 11 shows a state in which an electrode group unit for lithium ion capacitor according to the present invention is housed in a container and the container is tightly sealed with a container lid.

As shown in FIG. 11, the electrode group 5 to which the current collecting members have been welded, that is, the electrode group unit 2 for lithium ion capacitor, is housed in the container 3. With the electrode group unit 2 for lithium ion capacitor housed in the container 3, the dent 47 of the negative current collecting member 45 and the bottom portion of the container 3 are welded to each other by spot welding for electrical connection.

An insulating ring member 63 for electrical insulation between the positive current collecting member 39 and the container 3 is attached to the outer peripheral portion of the positive current collecting member 39. A drawing process has been performed on a portion of the container 3 in the vicinity of the opening portion so that the electrode group unit 2 for lithium ion capacitor is fixed in the container 3 as shown in FIG. 1B.

The container lid 55 forming a positive electrode terminal is disposed above the positive current collecting member 39. The container lid 55 includes a lid body 57 disposed on the positive current collecting member 39, and a lid cap 59 combined with the lid body 57. The lid body 57 is made of aluminum, and the lid cap 59 is made of steel plated with nicked as with the container 3. The lid cap 59 includes an annular flat portion 59a and a projected portion 59b projected from the center portion of the flat portion 59a. The container lid 55 is formed by curling (crimping) the edge portion of the lid body 57 around the outer peripheral portion of the flat portion 59a of the lid cap 59. A void portion 61 is formed between the projected portion 59b of the lid cap 59 and the lid body 57.

A first end of the positive terminal portion 44A, which is one of two positive terminal portions which are ribbon-like aluminum foils laminated over each other, is joined to the upper surface of the positive current collecting member 39. A first end of the other positive terminal portion 44B is welded to the outer bottom surface of the lid body 57 forming the container lid 55. Second ends of the two positive terminal portions 44A, 44B are joined to each other. This allows the lid body 57 to be electrically connected to one of the electrodes (positive electrode 9) of the electrode group 5.

An annular stepped portion 3a is formed in the container 3 which has been subjected to a drawing process as discussed above. The container lid 55 is disposed on the stepped portion 3a via an insulating member 65 for electrical insulation between the container lid 55 and the container 3. Then, an opening end portion 3b is curled (crimpled) toward the container lid 55. As a result, the container lid 55 is fixed between the opening end portion 3b subjected to a curling process and the stepped portion 3a via the insulating member 65. This allows the internal space of the capacitor 1 to be tightly sealed.

An amount of a non-aqueous electrolyte (not shown) that is enough to infiltrate the entire electrode group unit 2 for lithium ion capacitor is injected into the container 3. The non-aqueous electrolyte may be a solution obtained by dissolving lithium phosphate hexafluoride ($LiPF_6$) as lithium salt in a solvent obtained by mixing ethylene carbonate (EC), dimethyl carbonate (DMC), and diethyl carbonate (DEC) at a volume ratio of 30:50:20, for example.

(Modification of Current Collecting Members)

Figure 12:
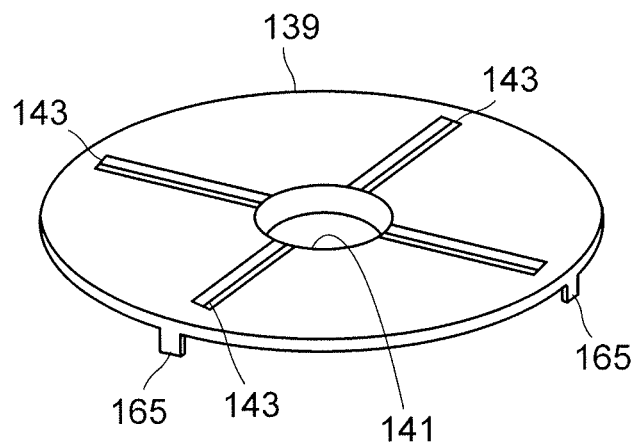
FIG. 12 shows a modification of the positive current collecting member according to the present invention.
Figure 13:
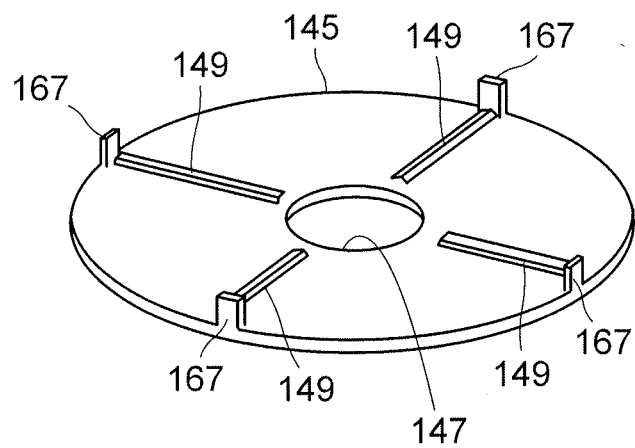
FIG. 13 shows a modification of the negative current collecting member according to the present invention.

FIGS. 12 and 13 each show a modification of the current collecting member. In FIGS. 12 and 13, component parts that are the same as those in the embodiment shown in FIGS. 5 and 6 are denoted by reference numerals obtained by adding 100 to the reference numerals affixed to their counterparts in FIGS. 5 and 6 to omit their descriptions. In the current collecting member of FIG. 12, grooves 143 are formed to be shorter than the diameter of a positive current collecting member 139. Lug portions 165 are formed at the outer peripheral portion of the positive current collecting member 139 on extensions of the grooves 143. The lug portions 165 hinder an electrode group 105 from moving radially. In addition, the lug portions 165 can prevent a molten metal from extending radially outward beyond the outermost layer of the electrode group 105. Lug portions 167 of a negative current collecting member 145 have the same effect.

INDUSTRIAL APPLICABILITY

According to the present invention, it is possible to provide an electrode group unit for capacitor in which current collecting members (positive current collecting member and negative current collecting member) and electrodes (positive electrode and negative electrode) are reliably welded to each other and which has a welded portion with a low resistance, and to provide a lithium ion capacitor with a low contact resistance.

REFERENCE SIGNS LIST

1: lithium ion capacitor
2: electrode group unit for lithium ion capacitor
3: container
5: electrode group
7: axial core
9: positive electrode
11: negative electrode
13: first separator
15: second separator
17: lithium metal support member
19: aluminum foil (positive current collector)
21: positive active material mixture
23: applied portion
25: unapplied portion
27: copper foil (negative current collector)
29: negative active material mixture
31: applied portion
33: unapplied portion
35: lithium metal
37: copper foil (support member)
39: positive current collecting member
41: hole
43: groove
44: positive terminal portion
45: negative current collecting member
47: dent
49: groove
51, 53: molten metal
55: container lid
57: lid body
59: lid cap
61: void portion
63: insulating ring member

The invention claimed is:

1. A method of manufacturing an electrode group unit for lithium ion capacitor comprising:
an electrode group formed by winding a laminated member in which a positive electrode formed by applying a positive active material mixture to an aluminum foil and a negative electrode formed by applying a negative active material mixture to a copper foil are laminated on each other via a separator;
a positive current collecting member made of aluminum and electrically connected to the aluminum foil of the positive electrode;
a negative current collecting member made of a metal material and electrically connected to the copper foil of the negative electrode; and
a lithium metal support member including lithium metal and a support member made of a copper foil and electrically connected to the negative current collecting member, the support member having ion permeability and having a structure for supporting the lithium metal, the lithium metal support member being disposed in or adjacent to the electrode group where the lithium metal support member is electrically insulated from the positive electrode and such that the lithium metal is occluded by a negative active material contained in the negative active material mixture of the negative electrode so that only the copper foil remains, the method being characterized by comprising:
preparing the negative electrode that has a layer of the negative active material mixture on the copper foil and has an unapplied portion of the copper foil on which the negative active material mixture is not applied along the layer of the negative active material mixture;
preparing the positive electrode that has a layer of the positive active material mixture on the aluminum foil and has an unapplied portion on which the positive active material mixture is not applied along the layer of the positive active material mixture;
forming the electrode group such that the unapplied portion of the negative electrode and the unapplied portion of the positive electrode project outside of the separator in directions opposite to each other, and such that the length of projection of an end portion of the support member from the separator is larger than the length of projection of the unapplied portion of the negative electrode from the separator;
disposing the lithium metal support member such that a layer in which the lithium metal support member is wound is located in a radially middle region of the electrode group;
placing the negative current collecting member on the unapplied portion of the negative electrode of the electrode group and the end portion of the support member, and locally melting the negative current collecting member by continuously irradiating the negative current collecting member with laser light continuously generated by a direct-condensing semiconductor laser device, to weld the unapplied portion of the negative electrode and the end portion of the support member and the negative current collecting member to each other with a molten metal; and placing the positive current collecting member on the unapplied portion of the positive electrode of the electrode group, and locally melting the positive current collecting member by continuously irradiating the positive current collecting member with laser light continuously generated by a direct-condensing semiconductor laser device, to weld the unapplied portion of the positive electrode and the positive current collecting member to each other with a molten metal, wherein a recessed portion or a projected portion extending linearly is formed by pressing at a portion of each of the negative current collecting member and the positive current collecting member that is irradiated with the laser light.

2. A method of manufacturing an electrode group unit for lithium ion capacitor comprising:

an electrode group formed by winding a laminated member in which a positive electrode formed by applying a positive active material mixture to an aluminum foil and a negative electrode formed by applying a negative active material mixture to a copper foil are laminated on each other via a separator;

a positive current collecting member made of aluminum and electrically connected to the aluminum foil of the positive electrode;

a negative current collecting member made of a metal material and electrically connected to the copper foil of the negative electrode; and a lithium metal support member including lithium metal and a support member made of a copper foil and electrically connected to the negative current collecting member, the support member having ion permeability and having a structure for supporting the lithium metal, the lithium metal support member being disposed in or adjacent to the electrode group where the lithium metal support member is electrically insulated from the positive electrode and such that the lithium metal is occluded by a negative active material contained in the negative active material mixture of the negative electrode so that only the copper foil remains, the method being characterized by comprising:

preparing the negative electrode that has a layer of the negative active material mixture on the copper foil and has an unapplied portion of the copper foil on which the negative active material mixture is not applied along the layer of the negative active material mixture;

preparing the positive electrode that has a layer of the positive active material mixture on the aluminum foil and has an unapplied portion on which the positive active material mixture is not applied along the layer of the positive active material mixture;

forming the electrode group such that the unapplied portion of the negative electrode and the unapplied portion of the positive electrode project outside of the separator in directions opposite to each other;

placing the negative current collecting member on the unapplied portion of the negative electrode of the electrode group and the end portion of the support member, and locally melting the negative current collecting member by continuously irradiating the negative current collecting member with laser light continuously generated by a direct-condensing semiconductor laser device, to weld the unapplied portion of the negative electrode and the end portion of the support member and the negative current collecting member to each other with a molten metal; and placing the positive current collecting member on the unapplied portion of the positive electrode of the electrode group, and locally melting the positive current collecting member by continuously irradiating the positive current collecting member with laser light continuously generated by a direct-condensing semiconductor laser device, to weld the unapplied portion of the positive electrode and the positive current collecting member to each other with a molten metal, wherein a recessed portion or a projected portion extending linearly is formed by pressing at a portion of each of the negative current collecting member and the positive current collecting member that is irradiated with the laser light.

3. The method of manufacturing an electrode group unit for lithium ion capacitor according to claim 1, wherein welding is performed such that the molten metal does not extend radially outward beyond an electrode layer located on the radially outermost side of the electrode group.

4. The method of manufacturing an electrode group unit for lithium ion capacitor according to claim 2, wherein the electrode group is formed such that the length of projection of an end portion of the support member from the separator is larger than the length of projection of the unapplied portion of the negative electrode from the separator.

5. The method of manufacturing an electrode group unit for lithium ion capacitor according to claim 2, further comprising:

disposing the lithium metal support member such that a layer in which the lithium metal support member is wound is located in a radially middle region of the electrode group.

6. The method of manufacturing an electrode group unit for lithium ion capacitor according to claim 1, wherein the metal material is nickel or copper plated with nickel.

7. A lithium ion capacitor comprising an electrode group unit for lithium ion capacitor manufactured by the method according to claim 1.

8. A lithium ion capacitor having an electrode group unit for lithium ion capacitor housed in a bottomed container, an opening portion of which is sealed by a lid member serving also as a terminal electrode, the electrode group unit for lithium ion capacitor comprising:

an electrode group formed by winding a laminated member in which a positive electrode formed by applying a positive active material mixture to an aluminum foil and a negative electrode formed by applying a negative active material mixture to a copper foil are laminated on each other via a separator;

a positive current collecting member made of aluminum and electrically connected to the aluminum foil of the positive electrode;

a negative current collecting member made of a metal material and electrically connected to the copper foil of the negative electrode; and a lithium metal support member including lithium metal and a support member made of a copper foil and electrically connected to the negative current collecting member, the support member having ion permeability and having a structure for supporting the lithium metal, the lithium metal support member being disposed in or adjacent to the electrode group where the lithium metal support member is electrically insulated from the positive electrode and such that the lithium metal is occluded by a negative active material contained in the negative active material mixture of the negative electrode so that only the copper foil remains, wherein:

the negative electrode has a layer of the negative active material mixture on the copper foil and has an unapplied portion of the copper foil on which the negative active material mixture is not applied along the layer of the negative active material mixture, and the positive electrode has a layer of the positive active material mixture on the aluminum foil and has an unapplied portion on which the positive active material mixture is not applied along the layer of the positive active material mixture;

the electrode group is formed such that the unapplied portion of the negative electrode and the unapplied portion of the positive electrode project outside of the separator in directions opposite to each other;

the negative current collecting member is laser-welded to the unapplied portion of the negative electrode of the electrode group and an end portion of the support member;

the metal material of the negative current collecting member is a material that is melted by laser light continuously output from a direct-collecting semiconductor laser device, and a recessed portion or a projected portion extending linearly is formed by pressing at a portion of each of the negative current collecting member and the positive current collecting member that is irradiated with the laser light.

9. The lithium ion capacitor according to claim 8, wherein the metal material is nickel or copper plated with nickel.

10. The method of manufacturing an electrode group unit for lithium ion capacitor according to claim 2, wherein
welding is performed such that the molten metal does not extend radially outward beyond an electrode layer located on the radially outermost side of the electrode group.

11. The method of manufacturing an electrode group unit for lithium ion capacitor according to claim 2, wherein
the metal material is nickel or copper plated with nickel.

12. A lithium ion capacitor comprising an electrode group unit for lithium ion capacitor manufactured by the method according to claim 2.

* * * * *